Figure 1:
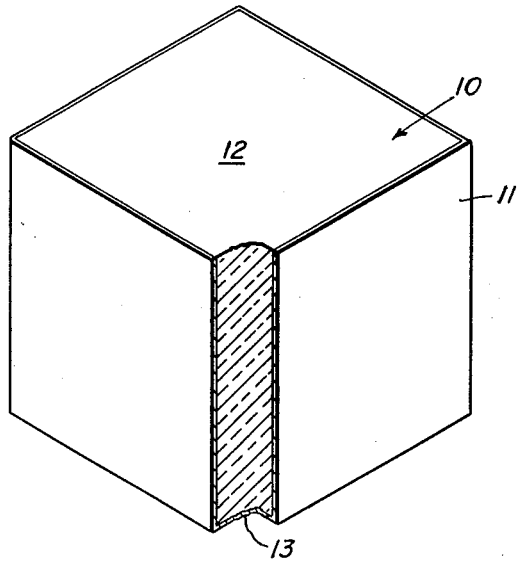

Nov. 3, 1964 C. A. BRUCH 3,155,534
METHOD OF MAKING MAGNESIA-ALUMINA SPINEL BODIES
Filed May 24, 1961

Inventor:
Charles A. Bruch,
by Richard G. Speer
His Attorney.

United States Patent Office 3,155,534
Patented Nov. 3, 1964

3,155,534
METHOD OF MAKING MAGNESIA-ALUMINA SPINEL BODIES
Charles A. Bruch, Schenectady, N.Y., assignor to General Electric Company, a corporation of New York
Filed May 24, 1961, Ser. No. 112,180
4 Claims. (Cl. 117—5.5)

This invention relates to magnesia-alumina spinel bodies and more particularly to an improved process for producing such bodies without the formation of any crystalline faults.

Production of magnesia-alumina spinels, including the stoichiometric spinel $MgAl_2O_4$, is normally accomplished by taking a suitably prepared starting body consisting of substantially pure alumina and reacting this body with magnesia. The alumina should be at least 99.9 percent pure, balance incidental impurities, although minor amounts of magnesia of up to about 0.5 weight percent may be added if desired. In accordance with prior practices, all of the exposed surfaces of the alumina body are simultaneously subjected to the presence of magnesia, thus resulting in spinel formation over the entire surface of the body. Continued contact with magnesia causes the spinel, which is formed initially on the outer surfaces of the alumina body, to extend inwardly until the entire alumina matrix has been converted. The principal drawback attending this procedure resides in the formation of a fault located approximately midway between opposed surfaces of the body. For example, in the case of a tube, both the inner and outer wall surfaces are continuously reacting with magnesia so that the spinel being formed is growing inwardly from each wall toward the center of the tube wall. Or considering, on the other hand, a piece of generally cubic symmetry, the spinel layer grows inwardly from all pairs of opposed surfaces toward the center of the cube. The point, line or plane, depending upon the geometry of the specimen being treated, where the spinel layers ultimately meet is a region of crystalline fault representing a severe structural weakness in the final spinel body. It is obvious that in some geometries this fault constitutes no real problem as, for example, in the case of cylindrical rod where the fault would be a line extending axially along the length of the rod, whereas in other geometries such as a flat sheet, the central fault constitutes an entire plane along which cleavage or separation of the sheet into separate parts occurs quite easily.

It is a principal object of this invention to provide a process for eliminating central faults in spinel bodies produced by reacting magnesia and alumina.

It is an additional object of this invention to provide improved bodies composed of magnesia-alumina spinel which contain no crystalline faults.

A further object of this invention is to provide a process for producing bodies of magnesia-alumina spinel which vary in composition throughout the thickness thereof.

Other objects and advantages will be in part obvious and in part explained by reference to the accompanying specification and drawings.

Figure 2:
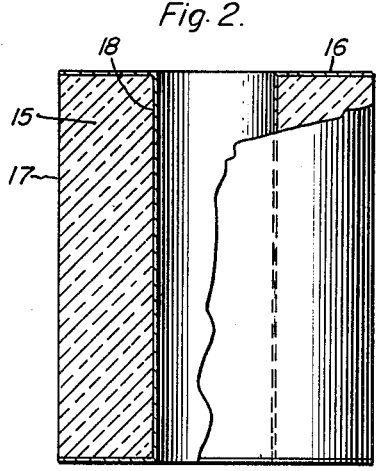

FIGURE 1 is a perspective view, partially broken away, showing the manner in which spinel formation is effected on bodies of generally rectangular section; and FIGURE 2 is a partially-sectioned front elevation showing how spinel growth is effected on tubular bodies.

The general process is one in which polycrystalline alumina bodies, which may be of varying degrees of density, are reacted with magnesia in such a way that the spinel formation begins on an exposed surface of the alumina body and proceeds inwardly through the body, stopping at a surface opposed to the initial reaction surface. In order that conversion does not take place from surfaces that are substantially opposed one to the other, one of the opposed surfaces is masked either by isolating it from the magnesia or by covering it with a diffusion barrier such as molybdenum or tungsten foil or sintered powder. By preventing contact of magnesia with one of the opposed surfaces, it is then possible for the reaction to progress from only one surface and thereby eliminate any crystalline fault which might otherwise result. The product of the invention is a spinel body having no crystalline faults resulting from the meeting of spinel growth regions.

The alumina bodies with which the present invention is especially concerned are those made of alumina not less than about 99 percent pure, balance substantially all incidental impurities, and polycrystalline alumina bodies containing up to about 0.5 weight percent magnesia may be used. Polycrystalline bodies made only of alumina can be produced by the usual type of ceramic operations, for example as by slip casting the alumina into the desired shape and then sintering until the desired density is achieved. Alternatively, alumina powder of the proper size may be pressed in a die to a preselected green density and then fired or sintered to form a body of selected density.

Where alumina bodies containing up to about 0.5 weight percent magnesia are to be used, the processing may be carried out in accordance with the procedures described and claimed in the copending application of Coble, Series No. 80,965, filed January 3, 1961, now Patent No. 3,026,210, March 20, 1962, and assigned to the same assignee as the present invention. This process is generally one wherein minor amounts of magnesia are thoroughly mixed with alumina, compacted to form a green compact and given a two-stage firing which results in a body of extreme density and one which is also substantially transparent.

Magnesia can be supplied to the surface where conversion to spinel is to be initiated by any suitable means. Specifically, the surface can be placed in direct contact with a body of magnesia or a magnesia-containing compound such as magnesium-carbonate, and then heated to from about 1500° C. to 1900° C. in a selected atmosphere so that reaction will occur between the magnesia and alumina surface. The problem of preventing magnesia contact with the remaining surfaces of the alumina body is not as critical in this instance as where magnesia is supplied in vaporized form in a hydrogen atmosphere or in an atmosphere containing hydrogen. However, to prevent any possible reaction at the remaining surfaces, these surfaces can be masked by applying a film of a diffusion barrier metal, such as molybdenum or tungsten, to them prior to initiation of the operation. Additionally, the alumina body might be so arranged so that only the surface to be reacted is contained in the same chamber with the magnesia body.

Magnesia may also be supplied to the alumina surface by placing a quantity of magnesia or magnesia-containing compound in a closed chamber with the alumina body. In this instance, the hydrogen atmosphere is used to carry the magnesia vapor to the unmasked surface or surfaces. This procedure can be effected either in a static hydrogen atmosphere or in one in which a continuous supply of hydrogen is passed over the magnesia and then into contact with the alumina body. The latter procedure, i.e., the flowing hydrogen stream, provides a somewhat faster spinel formation rate since a continuous supply of magnesia is assured.

The manner in which conversion of alumina bodies made up of alumina not less than 99 percent pure, can be transformed into magnesium-aluminate spinel, can be seen by reference to the figures of the drawing. Referring to FIGURE 1, a high density alumina body 10 has been shielded on all sides except one with a suitable diffusion barrier metal 11, such as the molybdenum or tungsten mentioned earlier. Thus, the upper surface 12 of the alumina body 10 is exposed for contact with magnesia (MgO). The magnesia may be either in particulate form or may be brought into contact with surface 12 by means of a vapor transport in a hydrogen or other suitable atmosphere. Since only the one surface 12 is contacted with magnesia, the stoichiometric spinel $MgAl_2O_4$ forms first at this surface and progresses downwardly toward the bottom surface 13 of body 10. Obviously, the diffusion time to completely convert the alumina into spinel increases as the thickness of the starting body increases. On the other hand, the fact that spinel formation occurs only from a single direction results in the elimination of any central crystalline faults which would otherwise be present if multi-directional diffusion were occurring. This, the resultant body is physically stronger and is optically much more perfect than spinels formed other than by unidirectional diffusion. FIGURE 2 shows one manner in which unidirectional diffusion of magnesia into alumina can be effected on a generally tubular body. Specifically, alumina tube 15 has been shielded on both ends and on the inner wall with a diffusion shield 16, this shield effectively preventing any passage of magnesia into the alumina. In the indicated arrangement, magnesia can enter the alumina body only from the outer surface 17 and progressively convert the body into the spinel $MgAl_2O_4$ as diffusion takes place between outer surface 17 and inner surface 18.

At constant temperature, the growth rate of the spinel layer generally follows the relationship $x = Kt^{1/2}$, where $x$ is the thickness of the spinel layer, $t$ is the diffusion time, and $K$ is a constant which is temperature dependent. For example, at 1900° C. where $x$ is in thousandths of an inch and time is in hours, the value of $K$ is 12.5. The temperature dependence can be expressed as an activation energy which was found to be about 92 kilocalories per mol. Conversion of an alumina body into spinel following this growth rate results in a composition gradient ranging from stoichiometric to aluminum-rich compositions which are dependent upon the temperatures used. If desired, the composition gradient can be reduced by prolonged times at the diffffusion temperature used.

Considering the application of the process to some specific alumina body geometries, rectangular pieces which have three pairs of generally opposed wall surfaces should have at least three of the sides masked so that growth of the spinel inwardly from the remaining three reaction surfaces will take place. It would also be possible to mask all except one of the surfaces, thereby assuring that inward growth of the spinel from the one remaining reaction surface will take place in the same direction throughout the entire thickness of the body.

Tubular shapes, on the other hand, can use either the inner or the outer surface as the spinel reaction surface, depending upon the preference of the manufacturer. Diffusion inwardly from the outer surface can be accomplished by sealing the ends of the tube so that growth occurs radially inwardly toward the center of the tube. Growth from the inside wall can be accomplished by placing a quantity of magnesia inside the tube and then sealing the ends and heating to the required temperature. At the end of this operation, the tube may then be opened and the excess magnesia removed if desired.

Flat, plate-like or sheet configurations can be converted from alumina to spinel by coating one side of the plate or sheet with a masking material and then allowing the reaction to proceed from the opposite side which is permitted to remain free for contact with magnesia.

Plate or disk-like specimens constructed of alumina of the type produced in the previously mentioned copending application Serial No. 80,965, now Patent No. 3,026,210, March 20, 1962, were used to check for the presence of central crystalline faults when spinel formation was permitted to take place from opposed surfaces. These disks were 0.1 inch thick by from about ¾ to 4½ inches in diameter and were placed in a boat made from molybdenum foil, together with a quantity of magnesia single crystals. A covering of molybdenum foil was placed over the boat and held in position by suitable fastening means. This entire assembly was then heated in a hydrogen atmosphere at temperatures ranging between 1500° C. and 1900° C. for times sufficient to permit conversion of the disk-like specimens into magnesia-alumina spinel. Examination of the specimens following this treatment indicated that all had a central fault plane and could be quite easily split along this plane.

Much the same procedure was carried out on alumina tubing having compositions similar to those used on the disk-like specimens. The tubes were about ⅜ inch in outer diameter with a wall thickness of from 0.2 to 0.3 inch and were about 3 to 4 inches long. These tubes were supported at each end by molybdenum V blocks and heated to 1900° C. in hydrogen in the presence of magnesia pellets and held at this temperature for periods of time ranging from 4 to 16 hours. Due to the fact that spinel growth from both the inner and outer surfaces from the tube was permitted, a fault plane was created roughly midway between the inner and outer walls of the tubes.

As previously mentioned, the fault planes or lines are overcome by masking at least one of any pair of opposed surfaces present on the basic alumina body, thereby limiting growth of spinel to one direction. This procedure permits the production of spinel bodies which contain no areas of weak mechanical strength and which are not subject to undue cracking during use. Additionally, where the initial body is of proper density and free of voids and cracks, spinel bodies of unusual transparency can be obtained.

If the time at which the magnesia and alumina are held at reaction temperatures is limited to essentially that required to just convert all of the alumina to spinel, a composition gradient is obtained across the thickness of the spinel bodies which ranges from stoichiometric composition ($MgAl_2O_4$) at the exposed face to an aluminum-rich composition at the masked face. This feature may be important for some applications since the coefficients of thermal expansions vary according to the composition differences. Thus, in applications where a temperature gradient exists across the thickness of the body, the varying coefficients of expansion can reduce induced stress which would otherwise arise and render the body unacceptable for use.

Although the present invention has been described in connection with preferred embodiments, it is to be understood that modifications and variations may be resorted to without departing from the spirit and scope of the inveniton, as those skilled in the art will readily understand. Such modifications and variations are considered to be within the purview and scope of the invention and the appended claims.

What I claim as new and desire to secure by Letters Patent of the United States is:

1. The method of forming a body consisting of magnesia-alumina spinel from a polycrystalline alumina body having substantially opposed surfaces, said method comprising contacting one surface only of the alumina body with magnesia at a temperature of from about 1500 to 1900° C., and continuing the contact for a time sufficient to transform all of the alumina into the magnesia-alumina spinel $MgAl_2O_4$ by progressive growth of the spinel into the alumina body from the one contact surface.

2. The method as defined in claim 1 wherein vaporized magnesia is used to contact one surface of the alumina body.

3. The method of forming a body consisting of magnesia-alumina spinel from a polycrystalline alumina body, said method comprising masking all surfaces of the alumina body from the surrounding environment except one, contacting the remaining unmasked surface with magnesia at a temperature of from about 1500 to 1900° C., and continuing the contact for a time sufficient to transform all of the alumina into the magnesia-alumina spinel $MgAl_2O_4$ by growth of the spinel into the alumina body from the unmasked surface.

4. The method as defined in claim 3 wherein the masking is done with a diffusion barrier material selected from the group consisting of molybdenum and tungsten.

References Cited by the Examiner
UNITED STATES PATENTS

| | | | |
|---|---|---|---|
| 1,394,442 | 10/21 | Purdy et al. | 106—62 |
| 1,448,684 | 5/23 | Beecher et al. | 117—125 |
| 2,618,566 | 11/52 | Robinson | 106—62 |
| 2,989,421 | 6/61 | Novak | 117—106 |
| 3,026,210 | 3/62 | Coble | 106—37 |

RICHARD D. NEVIUS, *Examiner.*